United States Patent
Wong et al.

(10) Patent No.: US 10,196,901 B2
(45) Date of Patent: Feb. 5, 2019

(54) COOLING OF ENGINE COMPONENTS

(71) Applicant: ROLLS-ROYCE PLC, London (GB)

(72) Inventors: Tsun H. Wong, Manchester (GB);
Peter T. Ireland, Oxford (GB); Kevin P. Self, Bristol (GB)

(73) Assignee: ROLLS-ROYCE plc, London (GB)

( * ) Notice: Subject to any disclaimer, the term of this patent is extended or adjusted under 35 U.S.C. 154(b) by 217 days.

(21) Appl. No.: 14/944,947

(22) Filed: Nov. 18, 2015

(65) Prior Publication Data
US 2016/0169003 A1    Jun. 16, 2016

(30) Foreign Application Priority Data
Dec. 16, 2014  (GB) .................................. 1422322.6

(51) Int. Cl.
*F01D 5/18* (2006.01)
*F01D 9/04* (2006.01)
(Continued)

(52) U.S. Cl.
CPC ............. *F01D 5/186* (2013.01); *F01D 5/187* (2013.01); *F01D 9/041* (2013.01); *F01D 9/065* (2013.01);
(Continued)

(58) Field of Classification Search
CPC .......... F01D 9/065; F01D 9/041; F01D 5/187; F05D 2220/32; F05D 2250/183; F05D 2250/184
See application file for complete search history.

(56) References Cited

U.S. PATENT DOCUMENTS 3,819,295 A * 6/1974 Hauser .................... B23P 15/04
                                                   416/96 A
4,203,706 A * 5/1980 Hess ......................... F01D 5/14
                                                     415/115
(Continued)

FOREIGN PATENT DOCUMENTS

| EP | 1607577 A2 | 12/2005 |
| SU | 779590 A1 | 11/1980 |
| WO | 20051083236 A1 | 9/2005 |

OTHER PUBLICATIONS

Jun. 15, 2015 Search Report issued in Brittish Patent Application No. 1422322.6.
(Continued)

*Primary Examiner* — Logan Kraft
*Assistant Examiner* — Justin A Pruitt
(74) *Attorney, Agent, or Firm* — Oliff PLC

(57) ABSTRACT

A component, e.g. an aerofoil component like a turbine-blade or guide-vane, for a gas turbine engine, including first and second walls defining at least one passage for supply of cooling fluid to a portion of the component to be cooled, the portion including a slot via which cooling fluid passes from the passage to exit of slot for effecting cooling of the portion, wherein the slot includes at least one side wall, pair of opposite side walls, each having surface profile defining array of channels for passage of cooling fluid, and surface profile defining each of arrays of channels is undulating with the respective arrays of channels in two side walls being angled with respect to one another. The resulting internal cross-corrugated cooling arrangement promotes enhanced cooling of the trailing edge or other portion of the component by controlling flow rate of cooling air through slot and exhausted therefrom.

20 Claims, 10 Drawing Sheets

(51) Int. Cl.
*F01D 25/12* (2006.01)
*F01D 9/06* (2006.01)

(52) U.S. Cl.
CPC .......... *F01D 25/12* (2013.01); *F05D 2220/32* (2013.01); *F05D 2230/21* (2013.01); *F05D 2230/31* (2013.01); *F05D 2240/12* (2013.01); *F05D 2240/122* (2013.01); *F05D 2240/30* (2013.01); *F05D 2240/304* (2013.01); *F05D 2250/183* (2013.01); *F05D 2250/184* (2013.01); *F05D 2250/294* (2013.01); *F05D 2260/202* (2013.01); *F05D 2260/204* (2013.01); *F05D 2260/2214* (2013.01); *F05D 2260/22141* (2013.01); *Y02T 50/673* (2013.01); *Y02T 50/676* (2013.01)

(56) References Cited

U.S. PATENT DOCUMENTS

| | | | |
|---|---|---|---|
| 4,407,632 A | 10/1983 | Liang | |
| 5,465,572 A | 11/1995 | Nicoll et al. | |
| 7,753,650 B1 | 7/2010 | Liang | |
| 8,052,378 B2 * | 11/2011 | Draper | F01D 5/186 415/115 |
| 2014/0321980 A1 * | 10/2014 | Lee | F01D 5/187 415/115 |

OTHER PUBLICATIONS

Nov. 13, 2017 Search Report issued in French Application No. 1562089.

* cited by examiner

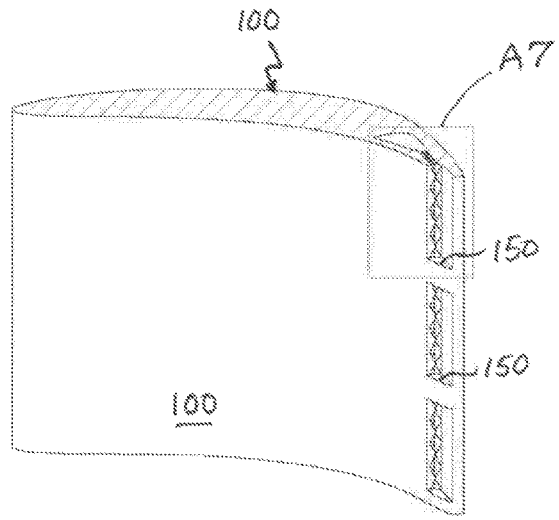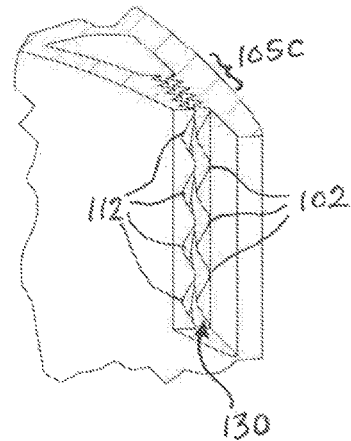
FIG. 7(a)  FIG. 7(b)
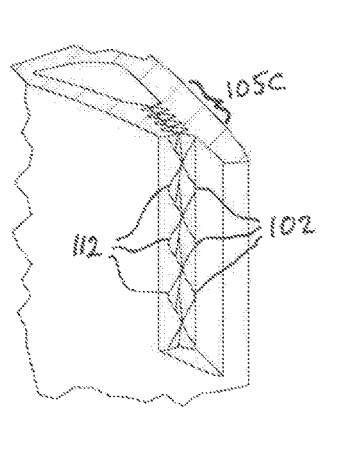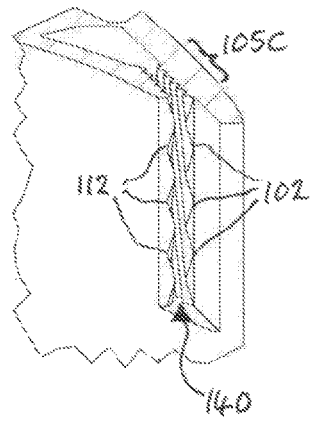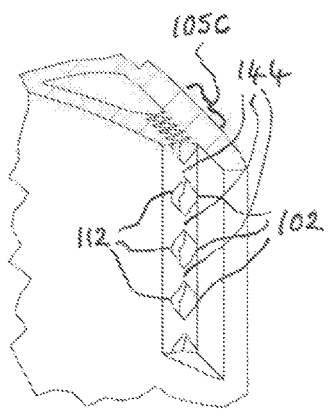
FIG. 7(c)  FIG. 7(d)  FIG. 7(e)

COOLING OF ENGINE COMPONENTS

TECHNICAL FIELD

This invention relates to the cooling of components of engines, especially gas turbine engines. More particularly, though not exclusively, it relates to components such as turbine blades and guide vanes which employ internal cooling arrangements to effect cooling thereof, and especially such components which utilise a slot-based cooling arrangement to effect cooling of one or more particular portions thereof, such as a trailing edge portion.

BACKGROUND OF THE INVENTION AND PRIOR ART

It is well known in various types of gas turbine engine, especially those in the aviation field, to employ internal cooling arrangements for aerofoil components such as turbine blades and guide vanes. The aerofoil component typically comprises a pressure wall and a suction wall, and has leading and trailing edges, with the walls defining at least one internal passage for supply of a cooling fluid, usually cooling air, to one or more internal cooling features in the form of one or more holes and/or slots for effecting film cooling as the cooling air passes therethrough and out thereof and onto the exterior of the component. The trailing edge portion in particular of such an aerofoil component is often difficult to provide with an efficient cooling arrangement, because of its narrow geometry and the limitations of conventional casting techniques in being able to reliably and accurately form the requisite one or more cooling holes and/or slots in such a region of the component.

One example of a known hole-based internal cooling arrangement for the trailing edge portion of a turbine blade is shown in U.S. Pat. No. 3,819,295. Here two sets of drilled holes provided in the trailing edge portion of the blade form passageways which link an internal cooling fluid (typically air) supply passage with the rear trailing edge of the blade. Each set of holes is angled with respect to the other such that passageways of one set intersect those of the other set, thereby forming a lattice with the intersecting nodes acting as turbulence promoters and area increasers for improved convective heat transfer from the blade body to the cooling fluid. However, this cooling arrangement is difficult, time-consuming and costly to manufacture. It also leaves large areas of uncooled material in the hub and tip regions of the blade where space is limited and thus holes cannot be drilled, nor even formed by casting owing to the too small a size they would need to have.

In contrast, slot cooling of various kinds for the trailing edge portion of an aerofoil component has been used in many known designs of turbine blades and guide vanes, and compared with simple multi-hole cooling arrangements, the use of a continuous internal slot feed between the internal cooling passage and the trailing edge at the rear of the component results in high performance film cooling with high cooling effectiveness. This is primarily a result of the slot feed producing a continuous cover of the cooling film, without gaps or spaces therein that typically arise from the use of rows of holes. Although in some existing arrangements based on the use of holes it may sometimes be possible to use double rows of holes which are staggered with respect to each other in order to enhance the cooling film cover, this strategy may be difficult to implement in practice at the trailing edge of an aerofoil component because of insufficiency of available space to accommodate such an arrangement.

One example of a known slot-based internal cooling arrangement for the trailing edge portion of a turbine blade is shown in U.S. Pat. No. 4,407,632. Here a trailing edge slot is formed with an internal array of pedestals extending across its width, wherein selected pairs of pedestals are connected by a barrier wall attached to either the pressure side or suction side of the slot. The barriers extend only part of the way across the slot in order to trip up, or interrupt, the thermal boundary layer of cooling air flow, thereby allowing improved heat transfer from the blade body to the cooling fluid. However, this design of cooling arrangement is characterised by many sharp edges to the various features within the slot, making casting thereof difficult and leading to reduced mechanical durability.

Another example of a slot-based internal cooling arrangement is shown in International Patent Application WO2005/083236A1. Here a blade comprises an inner space defined between two walls (suction side and pressure side), with a cooling fluid inlet at a leading edge and a cooling fluid outlet at a trailing edge so that the inner space forms a passage for cooling fluid to flow therethrough. The passage contains two sets of specially shaped and arranged ribs projecting inwardly from the respective suction and pressure side walls so as to form respective channels for cooling fluid to flow through the inner passage from the leading edge to the trailing edge. The respective channel flow directions are each at an inclined angle relative to the aerofoil radial direction and change in a smooth curve from the leading edge of the channels to the trailing edge of the channels. However, the channel directions in each set are at an inclined angle relative to each other in the proximity of the leading edge such that they intersect in this region, whereas in the region of the trailing edge the channels merge into each other to form common exit channels at the trailing edge. In between, the ribs in each set are connected at their respective intersections, but otherwise the flows in the channels can mix. However, this design of cooling arrangement is, like that of U.S. Pat. No. 4,407,632 above, again difficult to cast, owing to the complex arrangement of the ribs, and it is also not feasible to extend the arrangement specifically into the trailing edge region itself of the blade, where space is limited and casting cores present constraints of minimum sizes.

A further shortcoming of many known slot-based cooling arrangements, including those of U.S. Pat. No. 4,407,632 and WO2005/083236A1 discussed above, concerns the requirement to control the coolant mass flow through the slot if the cooling efficiency is to be optimised, which the above disclosed arrangements fail to do. This is because the pressure difference between the flow in the slot and the gas path external to the component needs to be above a predetermined minimum level in order to maintain the required coolant flow. However, current manufacturing techniques for aerofoil components in particular do not allow consistent enough production of trailing edge cooling slots which are thin enough to sufficiently control coolant mass flow on their own. For example, in the context of typical casting production methods, a very narrow slot would require a particularly narrow core, which would be fragile and easily fractured, making it commercially unviable for mass production.

There is therefore a need in the art for new and improved internal cooling arrangements in aerofoil and other components which utilise slot-based cooling, as well as methods for their efficient manufacture, which lead to improved control of coolant mass flow and thus pressure loss and resultant heat pickup during the passage of cooling fluid through such arrangements. It is therefore a primary object of the present invention to address this need.

SUMMARY OF THE INVENTION

Accordingly, aspects of the present invention relate to an engine component, a cooling arrangement for an engine component, a gas turbine engine including the component or a component including the cooling arrangement, and a method of cooling a slot-containing portion of an engine component.

In a first aspect the present invention provides a component for a gas turbine engine, comprising first and second walls defining at least one passage for supply of a cooling fluid, e.g. cooling air, to a portion of the component to be cooled, the said portion comprising a slot via which cooling fluid passes from the passage to an exit of the slot for effecting cooling of the portion, wherein the slot comprises at least one side wall having a surface profile defining an array of channels for passage of cooling fluid therethrough, and wherein the surface profile defining said array of channels is undulating.

In particularly preferred embodiments of the above first aspect, the slot may comprise a first side wall having a first surface profile defining a first array of channels for passage of cooling fluid, e.g. cooling air, therethrough, and a second side wall, opposite the first side wall, having a second surface profile defining a second array of channels for passage of cooling fluid therethrough, wherein each of the said first and second surface profiles is undulating and the channels of the first array are oriented so as to be non-parallel to the channels of the second array. Such preferred embodiments may thus in certain contexts be conveniently termed internal "cross-corrugated" cooling arrangements.

In embodiments of this first aspect of the invention the one or more arrays of channels may be provided in a portion of the slot which may extend over any longitudinal proportion of the slot. Thus, in some embodiments a longitudinal portion only of the slot, i.e. a first longitudinal portion of the slot less than its overall longitudinal length, may be provided with the said one or more arrays of channels in one or more respective side wall portions thereof. In this case, the slot may thus include a second longitudinal portion, especially a downstream portion, downstream of the first, preferably upstream, portion containing the said one or more arrays of channels and which does not contain any such array of channels therein. For example, such a non-channelled downstream portion of the slot may have one or more generally or partially flat and/or smooth inner surfaces or faces, although this may be subject to one or more such inner surfaces or faces comprising one or more optional surface formations thereon, e.g. one or more baffle elements, as will be defined and described further below. However, in other embodiments it may be possible for substantially the whole longitudinal length of the slot to be provided with the said one or more arrays of channels in one or more respective side walls thereof.

Further optional and/or preferred features of the surface profiles of the respective one or more side walls of the slot, as well as optional and/or preferred features of the component itself, will be defined further hereinbelow.

In a second aspect the present invention provides a cooling arrangement for a component of a gas turbine engine, wherein the component comprises first and second walls defining at least one passage for supply of a cooling fluid, e.g. cooling air, to a portion of the component to be cooled, the said portion comprising a slot via which cooling fluid passes from the passage to an exit of the slot for effecting cooling of the portion, wherein the cooling arrangement comprises at least one side wall of the slot which has a surface profile defining an array of channels for passage of cooling fluid therethrough, and wherein the said surface profile defining said array of channels is undulating.

In particularly preferred embodiments of the above second aspect, the cooling arrangement may comprise a first side wall of the slot having a first surface profile defining a first array of channels for passage of cooling fluid therethrough, and a second side wall, opposite the first side wall, having a second surface profile defining a second array of channels for passage of cooling fluid therethrough, wherein each of the said first and second surface profiles is undulating and the channels of the first array are oriented so as to be non-parallel to the channels of the second array.

In a third aspect the present invention provides a gas turbine engine comprising at least one component according to the first aspect or any embodiment thereof, or at least one component including a cooling arrangement according to the second aspect or any embodiment thereof.

In a fourth aspect the present invention provides a method of cooling a portion of a component of a gas turbine engine during operation thereof, wherein the component comprises first and second walls defining at least one passage for supply of a cooling fluid, e.g. cooling air, to the portion thereof, the said portion comprising a slot via which cooling fluid passes from the passage to an exit of the slot, wherein the slot comprises at least one side wall having a surface profile defining an array of channels for passage of cooling fluid therethrough, and wherein the surface profile defining said array of channels is undulating, wherein the method comprises, whilst operating the engine, passing cooling fluid, e.g. cooling air, from the passage to the exit of the slot via the slot such that the cooling fluid passes along the said array of undulating-profiled channels in the at least one side wall.

In particularly preferred embodiments of the method of the above fourth aspect, in which the slot comprises a first side wall having a first surface profile defining a first array of channels for passage of cooling fluid therethrough, and a second side wall, opposite the first side wall, having a second surface profile defining a second array of channels for passage of cooling fluid therethrough, wherein each of the said first and second surface profiles is undulating and the channels of the first array are oriented so as to be non-parallel to the channels of the second array, the method may comprise, whilst operating said engine, passing cooling fluid, e.g. cooling air, from the passage to the exit of the slot via the slot such that the cooling fluid passes along both of the said first and second arrays of undulating-profiled channels in the respective first and second side walls.

In especially preferred embodiments of the method of the above fourth aspect, cooling fluid, e.g. cooling air, is passed from the passage to the exit of the slot via the slot such that the cooling fluid passes along both of the said first and second arrays of undulating-profiled channels in the respective first and second side walls whilst additionally passing between at least one or more channels of the first array and at least one or more channels of the second array.

Further optional and/or preferred features of the method of the above fourth aspect will be defined further hereinbelow in conjunction with the further discussion of further optional and/or preferred features of the component itself.

As used herein the term "undulating", as applied to the or the respective side wall surface profile defining the or the respective array of channels therein, means that the surface profile is defined by a smooth, wavelike curve which changes smoothly in direction over at least a portion of its pitch (wavelength), preferably at least a major portion of its pitch (wavelength). In many preferred embodiments the undulating nature of the or the respective side wall surface profile may be such that it is defined by a wave function that varies in its height direction substantially continuously over at least a portion of its pitch (wavelength), preferably a major portion of its pitch (wavelength): in other words, the sectional profile of the surface forming each channel may be such that a tangent to the channel-defining surface, perpendicular to the channel longitudinal direction, varies in its angle of orientation (relative to the general plane of the respective side wall of the component) substantially continuously over at least a portion of its curve, preferably over at least a major portion of its curve, between one side of the channel and an opposite side thereof. In many embodiments the undulating nature of the or the respective side wall surface profile may be such that it is defined by a smoothly curved surface at least in valley (or trough) and/or peak regions thereof.

Preferably, therefore, the channels in the or the respective side wall surface are defined by a surface profile with substantially no sharp edges or corners, i.e. substantially no edges or corners which present an angled boundary between two adjacent surface portions thereof. This feature may assist, among other advantages to be had from embodiments of the invention as discussed elsewhere herein, in reducing deleterious stress concentrations in isolated portions of the channels' side walls.

In embodiments of the invention a wide variety of waveform shapes or functions may be used to define the undulating surface profile(s) which define the respective channels. The or each undulating surface profile may be a waveform of any suitable mathematical function or combination of two or more mathematical functions (e.g. different functions in different parts or regions of the curve defining the surface profile). The waveform may preferably be a regular repeating wave having a substantially constant wavelength (i.e. pitch) and/or amplitude.

By way of example, the wave function which defines the or each surface profile defining the respective channels may be a sinusoidal wave function, i.e. defined by a sine wave. Alternatively a polynomial (e.g. a quadratic or a cubic) or an exponential wave function may define the surface profile.

In other forms, the surface profile may be defined by a combination of two or more different shape or wave functions, each defining a different part or region of the curve defining the surface profile of a given channel. For example, a peak region between two adjacent channels and/or a valley or trough region of a given channel may each independently be defined by a part-circular, part-parabolic or part-hyperbolic curve, or part of any of the other wave functions defined above, with each peak region-valley/trough region pair being joined by a substantially straight tangential line.

In certain embodiments the shape or curve function which defines a trough or valley portion of any given channel may even be different from the shape or curve function which defines a peak portion thereof. For example, in one example form a trough or valley portion of a channel, especially a base region thereof, may be somewhat flattened, especially flattened in the trough or valley's lowermost region, whereas a neighbouring peak portion may be somewhat more curved in comparison therewith. This feature may for example contribute to reducing any tendency of the channel to become blocked by accumulated debris or deposits during use.

In many embodiments the internal side walls of each channel may be configured such that the internal shape of the channel is substantially symmetrical about a median plane bisecting the sectional profile that defines the channel side walls. However, in other embodiments the internal side walls of each channel may be configured such that the internal shape of the channel is substantially asymmetrical about such a median plane, in other words in a given channel the general gradient of one of its side walls may be different from, i.e. steeper or shallower than, the general gradient of the opposite one of its side walls. This feature may for example serve to better help control the direction of flow of cooling fluid along the channels by either encouraging or discouraging the fluid to flow over the peaks between adjacent channels, depending on the overall geometry of the arrangement.

In many embodiments of the invention the channels within the or each respective array may be substantially parallel to each other.

In many embodiments the channels within the or each respective array may be substantially straight over at least a portion, preferably a major proportion, of their longitudinal length. In other words, each channel may have a central longitudinal axis which is a substantially straight line over at least a portion, preferably a major proportion, of its length. However, in other embodiments the channels within the or each respective array may have a central longitudinal axis which itself varies in direction along at least a portion, e.g. a major or a minor proportion, of its length. In other words, the central longitudinal axis may itself be defined by a wave function such as any of those defined above, so that the channels are themselves wavy, undulating or convoluted in their longitudinal direction or axis.

In many embodiments of the invention the channels within the or each respective array may be substantially equi-spaced relative to each other.

In many practical embodiments of the present invention the component which is to be cooled and comprises the slot through which cooling fluid passes for effecting cooling of the portion may be any engine component which utilises a slot-based internal cooling arrangement. In many practical examples the component may be an aerofoil-sectioned component, such as a turbine blade or a guide vane. In such cases the first and second walls which define the at least one passage for the supply of the cooling fluid, which in many examples may also define the side walls of the slot of the portion to be cooled, may be constituted by a suction wall and a pressure wall of the aerofoil section, and may further define leading and trailing edges of the aerofoil.

Moreover, in many practical embodiments of the present invention the portion of the component which is to be cooled and comprises the slot through which cooling fluid passes for effecting cooling of the portion may be any portion of the component which utilises such a slot-based cooling arrangement to effect cooling thereof, especially to effect a cooling of one or more side walls, e.g. both of a pair of opposite side walls, thereof. In many embodiments that portion of the component may often be a trailing edge portion thereof, which in the case of aerofoil-sectioned engine components such as turbine blades and guide vanes often presents practical challenges for effecting efficient internal cooling thereof for reasons discussed hereinabove. However, embodiments of the invention may be applied also to other portions of aerofoil-sectioned or other engine components which likewise utilise a slot-based cooling arrangement to effect cooling thereof, especially to effect cooling of one or more side walls thereof. More particularly, embodiments of the invention may be further useful in cooling arrangements where tailored or specific control of cooling fluid mass flow and/or heat flux and/or pressure losses through a slot-based cooling arrangement may be desirable or needed.

As already mentioned, in particularly preferred embodiments of the invention the slot may comprise first and second side walls, preferably opposite and facing one another, which have respective first and second surface profiles defining respective first and second arrays of channels for passage of cooling fluid, e.g. cooling air, therethrough, wherein each of the said first and second surface profiles is undulating and the channels of the first array are oriented so as to be non-parallel to the channels of the second array.

In some preferred such embodiments the channels in the first array may be generally oriented with their longitudinal axes at a first angle relative to the radial direction of the component (i.e. radial relative to an axis of the engine into which the component is to be installed) and the channels in the second array may be generally oriented with their longitudinal axes at a second angle relative to the radial direction of the component, wherein both the first and second angles are each greater than 0° and less than 180° relative to the said radial direction (both angles being defined on the same axial side of that radial direction), and the first and second angles are different from one another, i.e. are non-equal. The difference between the said first and second angles may be termed the "included angle", for convenience.

In various practical embodiments the included angle may be selected from variable values thereof, as desired or as necessary, in order to assist in controlling the mass flow of cooling fluid through the respective channels, and thereby to assist in controlling the overall flow of cooling fluid through the slot itself. However, by way of a typical example, one of the first and second angles may be in the range of from about 30° to about 60° relative to the said radial direction, and the other of the first and second angles may be in the range of from about 120° to about 150°, thereby giving an included angle in the approximate range of from about 60° to about 120°. Of course, however, other values of the first, second and included angles may be suitable.

By increasing the included angle to higher values, e.g. to a higher value within the above preferred range, it may be possible in some embodiments thereby to reduce the flow rate of cooling fluid within the slot by causing extra pressure loss due to the interaction between the individual cooling fluid flows in the two arrays of channels. This reduced flow may also serve to increase the degree of temperature increase of the cooling fluid as it flows through the slot, which may increase the overall convective cooling efficiency of the arrangement.

Additionally or alternatively, the height (or depth) and/or the width of the or each channel in either or both of the first and second arrays may be selected from variable such values thereof, again as desired or as necessary, in order to further assist in controlling the mass flow of cooling fluid through the respective channels, and thus the overall flow of cooling fluid through the slot.

In some of the above-defined particularly preferred embodiments comprising respective first and second arrays of channels formed by the surface profiles of both the first and second side walls of the slot, the distance transversely across the slot between peaks of the channel-defining surface of the first array and peaks of the channel-defining surface of the second array may be selected from variable such values thereof, so that a minimum transverse separation or gap between the first and second arrays is selected so as to be of a predetermined value. In some embodiments that value may be for example zero, in which case the peaks of the channel-defining surface of the first array and peaks of the channel-defining surface of the second array may meet or abut or may even be united or joined together or possibly even merge into one another, whereas in other embodiments that value may for example be non-zero, in which case peaks of the channel-defining surface of the first array and peaks of the channel-defining surface of the second array may be spaced from one another by any suitable distance (e.g. a short distance, such as from about 0.01 or 0.05 or 0.1 mm to about 0.2 or 0.5 or 0.7 or 1.0 or 2.0 or 3.0 mm, or possibly even greater than 3.0 mm) to define a gap therebetween. This selection of any separation or gap between the respective peaks of the respective channel-defining surfaces of the first and second arrays may additionally be exploited in order to further assist in controlling the mass flow of cooling fluid through the respective channels, and thus the overall flow of cooling fluid through the slot. If desired or necessary, in cases where any such separation or gap exists between respective peaks of the respective channel-defining surfaces of the first and second arrays, there may be provided one or more, especially a plurality of, pedestal elements in said gap to connect or unite the respective channel peaks. In this manner the structural integrity of the arrangement may be enhanced.

It is a particularly useful feature of various preferred embodiments of the invention that the shape and configuration of the channels in the first and second arrays in the respective first and second side walls of the slot are such that the cooling fluid flowing in any given (or one or more selected) channel(s) of, respectively, the first or the second array is forced or urged or encouraged to switch or divert to flowing in a respective channel of, respectively, the second or the first array, as the case may be, as the cooling fluid flows through the slot from an upstream end thereof toward a downstream end thereof. Thus, a resulting "reflection" of the cooling fluid flow direction, from a channel in one side wall of the slot to a channel in the opposite side wall, may occur as it flows through the slot. This enhanced interaction between the respective fluid flows in the first and second arrays of channels may further contribute to increasing the pressure loss in the fluid flow as it passes through the slot, thereby further reducing its flow rate therethrough and so further enhancing the extraction of heat from the portion of the component to be cooled as the cooling fluid flow passes through the channels within the slot.

In order to further enhance this switching, diverting or reflection phenomenon of the cooling fluid as it flows along the channels of the respective array(s), and/or even as it flows out of the respective channel array(s) and/or into a portion of the slot downstream of the channel array(s), in some embodiments of the invention at least one of the slot side walls (or any portion thereof), and/or preferably at least one or more of the channels themselves in either or both of the arrays, may be provided with at least one baffle element configured so as to divert or change the flow direction of a flow of cooling fluid as it impinges thereon or thereagainst during its passage through the respective channel(s) and/or through the slot. In some embodiments a plurality of baffle elements may be provided in each, or at or adjacent exit mouths of, at least some of a plurality of the channels (e.g. in a trough or valley thereof) in either or both of the arrays, e.g. spaced apart longitudinally along the respective channel, in order to cause the flow direction of a flow of cooling fluid passing therethrough to be diverted or changed a plurality of times as it impinges on or against the elements during its passage through the channel(s) and/or the slot. Generally it may be preferred that the number of such "reflections" or changes of direction of the cooling fluid flow as it passes along the channels and through the slot should be as great as possible or as can be conveniently accommodated, in order to maximise the overall pressure drop in the cooling fluid flow as it passes through the slot and thereby to enhance the overall cooling efficiency of the arrangement.

The or each baffle element may of any suitable size, shape, configuration, location and positioning within the slot or channel, as the case may be, in order to most suitably control and effect a desired diverting or reflecting behaviour of the cooling fluid flow as it impinges thereon or thereagainst. The or each baffle element may for instance be provided within a respective channel, e.g. with at least a portion of the element in a lower or trough region of the channel. Alternatively the or each baffle element may be provided with at least a portion thereof protruding from a side wall of the respective channel and into the interior of that channel, and/or even into the interior of another channel, especially of a channel of a different respective array from that respective channel. Further alternatively the or each baffle element may be provided with at least a portion thereof protruding from a side wall of the slot itself or a portion thereof not actually containing the channel(s), for example with at least a portion of the baffle element protruding either (i) into a respective channel for interacting with a flow of the cooling fluid therein or exiting therefrom, or (ii) into a region of the slot adjacent and downstream of the exit or exit mouth of one or more respective channels for interacting with a flow of the cooling fluid upon its having exited therefrom. In the latter case, and where a plurality of such baffle elements are provided, they may be located in a spaced apart configuration in the radial direction of the component.

Suitable forms of baffle elements may include, for example, one or more walls, ribs, shoulders, lugs, buttresses, plates, lands or other like formations. In cases where any of such baffle elements are generally elongate in shape or extent, it/they may be substantially straight, or alternatively may be arcuate, curved, angled, convoluted or of any other suitable configuration, depending for example on the overall geometry of the arrangement and the space available.

In embodiments in which they are provided, such one or more baffle elements may preferably be integrally formed with the respective slot side wall or channel on or in which they are situated.

In embodiments in which they are provided, such one or more baffle elements may additionally serve to increase the mechanical strength of the respective slot side wall(s) and they may also increase heat flux between the side walls defining the slot, thereby helping to reduce thermal stresses therein.

In some embodiments of the invention, at least one or more of the channels of the or at least one respective array may each have a downstream portion, especially a terminal portion, which has a longitudinal direction which is different from that of a major, upstream portion thereof. In some such embodiments the respective channel(s) may comprise a downstream terminal portion which is configured to cause the flow of the cooling fluid therein to exit the channel(s) at a predetermined exhaust angle, especially a predetermined exhaust angle relative to the general longitudinal flow direction of fluid through the slot or alternatively relative to a flow direction of gas or other fluid external to the component at or adjacent the slot exit. This feature may serve to enhance the film cooling effect of the cooling fluid flow after it exits the slot.

Alternatively or additionally in some embodiments at least some of the channels of one of the arrays may terminate at or adjacent the exit of the slot in respective mouth portions which each combine together with corresponding respective mouth portions of at least some respective ones of the channels of the other of the arrays so as to form respective exhaust apertures having a predetermined shape and/or geometry. For this purpose, in some forms the respective mouth portions of the channels of the one array may be of substantially the same shape as the respective mouth portions of the channels of the other array, with both respective sets of mouth portions being either substantially in-phase or out-of-phase with each other, or alternatively partially in-phase or partially out-of-phase. In this manner respective exhaust apertures having a predetermined shape and/or geometry may be created by the relative degree of in-phase or out-of-phase alignment and/or shaping of the respective mouth portions of the respective channels of the one and the other arrays.

However, in other forms the respective mouth portions of the channels of at least one of the arrays may have a modified shape or configuration relative to that of the main bodies of the channels of that array, in order to provide yet further flexibility in selecting an optimum shape and/or geometry for the respective exhaust apertures. That modified shape or configuration may even for example be a different shape from the shape of corresponding respective mouth portions of the channels of the other of the arrays, thereby providing even more flexibility in tailoring the shape and/or geometry of the exhaust apertures.

Thus, in general the overall shape and/or geometry of the respective exhaust apertures may be selected so as to generate an exhaust flow or jet of cooling fluid exiting the slot with particular desired flow characteristics, e.g. of flow rate, direction, cross-sectional area or shape or other aspects of flow geometry. In practice therefore the shape and configuration of the respective mouth portions of the relevant channels may generally be tailored in order to optimise the exhaust flow geometry and thus the film cooling effectiveness as the flow exits the slot. Furthermore, in some embodiment arrangements the two opposite sides of the exit of the slot may be shaped differently, e.g. in order to tailor and optimise the respective cooling effects of the cooling air flow as portions of it exit the slot on opposite sides thereof.

In certain embodiments of the invention it may be possible to further enhance the film cooling effect of cooling fluid passing along the channels within the slot by providing in the portion of the component to be cooled one or more through-holes in one or more of the slot side walls, wherein the through-hole(s) permit a proportion of cooling fluid in channels of one or more of the arrays to flow from therewithin through the slot sidewall to an exterior surface (e.g. the suction side wall outer surface) of the component in order to effect film cooling on that exterior surface. Such one or more through-holes may be located in any desired or suitable longitudinal location along the slot, especially at any longitudinal position along the portion of the slot which contains the said one or more arrays of channels therein. For instance, such one or more through-holes may usefully be located in a region of the slot containing a downstream proportion, e.g. a downstream half or other major or minor proportion, of that longitudinal portion of the slot which contains the said one or more array(s) of channels therein. Such one or more through-holes may be any in number and may be oriented at any suitable angle, e.g. inclined at an acute angle relative to the general longitudinal direction of the slot, to facilitate the flow of cooling fluid thereout as the main flow of cooling fluid passes along the main volume of the slot. This feature of such one or more through-holes may be useful in arrangements where it is expected that the temperature of the cooling fluid may increase too much as it passes through the slot as a result of the enhanced degree of heat transfer arising from the improved geometry of the arrangement. In this situation the provision of such "short-cut" through-holes in the one or more slot side walls may help to deliver lower temperature coolant directly to the slot exit.

In practical implementation of embodiments of the invention the channels of the or each array may be formed in the respective slot side wall by various techniques. In one manufacturing method, which may possibly be utilised in less preferred embodiments although it is still possible within the scope of the invention, the channels in the or each array may be formed by casting, preferably by casting integrally with the main body of the respective side wall. Thus in such embodiments the channels of the or each array may constitute, and may be formed as, a particular integral surface pattern extending into and/or out of the general plane of the respective slot side wall and formed integrally therewith.

However, in an alternative manufacturing method, which may advantageously be utilised in more preferred embodiments, the channels in the or each array may be formed as an integral feature of the respective slot side wall by a layered deposition technique (or additive layer manufacturing (ALM) method, as it is sometimes known as), e.g. that known as Direct Laser Deposition. In this technique a powder of the material from which the side walls, and thus also the channels therein, are to be built up, e.g. particles of a metal alloy, is applied to a substrate or core, or a previously applied or formed layer thereof, and then subjected to laser radiation to melt or fuse the powder at high temperature and bond it to the substrate or layer beneath. Such ALM methods, techniques and apparatuses are in principle well known and widely available in the art, and will be well understood and readily practisable by the skilled person.

In some further embodiments of the invention the trailing edge slot may itself be tapered in its general longitudinal (flow) direction, such that its average width decreases going from the upstream end thereof to the downstream end thereof. In such embodiments the portion(s) or region(s) of the respective slot side wall(s) which contain the respective array(s) of channels, i.e. which define the corrugated slot portion, may extend upstream sufficiently so as to extend into that portion of the slot which broadens out with increased width, whereby the general planes of the opposite side walls portions which define the resulting corrugated slot portion are substantially non-parallel with the width of the corrugated slot section increasing traversing in an upstream direction thereof. This feature may be useful especially in the case of an ALM method being used to manufacture the component, where it may generally be advantageous to be able to extract or remove excess, remnant, or waste powder therefrom after formation of the channelled side walls by such an ALM process: the resulting broader (i.e. wider) width of the slot at the point of entry into the downstream region thereof containing the ALM-formed channels may thus facilitate access to that downstream region and thus removal of unused or waste powder therefrom.

As already mentioned, the present invention and embodiments thereof may be applied to any portion of an aerofoil-sectioned or other engine component which utilises a slot-based cooling arrangement to effect cooling thereof. In many applications the portion of the component having the invention, applied thereto may be a trailing edge portion of an aerofoil-sectioned component such as a turbine blade or a guide vane, although it may be applied to other portions of such components as well. Moreover the invention and embodiments thereof may be applied to other engine components apart from aerofoil-sectioned components, and indeed in some embodiments the invention may be applied to various other types of engine component which too utilise a slot-based cooling arrangement to effect cooling thereof.

Within the scope of this application it is expressly envisaged that the various aspects, embodiments, examples and alternatives, and in particular the individual features thereof, set out in the preceding paragraphs, in the claims and/or in the following description and drawings, may be taken independently or in any combination. For example, features defined or described in connection with one embodiment are applicable to any and all embodiments, unless expressly stated otherwise or such features are incompatible.

BRIEF DESCRIPTION OF THE DRAWINGS

Embodiments of the invention will now be described in detail, by way of example only, with reference to the accompanying drawings, in which:

FIG. 7(a) is a generalised end perspective view (from the trailing edge end) of the aerofoil component of FIGS. 3 and 4;

FIGS. 7(b), 7(c), 7(d) and 7(e) are various enlarged end perspective views, in accordance with various alternative embodiments of the invention, of the area A7 of the component as shown in FIG. 7(a), of various configurations of exhaust outlets via which cooling air exits the trailing edge slot, which exhaust outlets are formed by the combining together in various mutual configurations of mouth portions of facing channels in the exit region of the slot;

DETAILED DESCRIPTION OF EMBODIMENTS OF THE INVENTION

Figure 1:
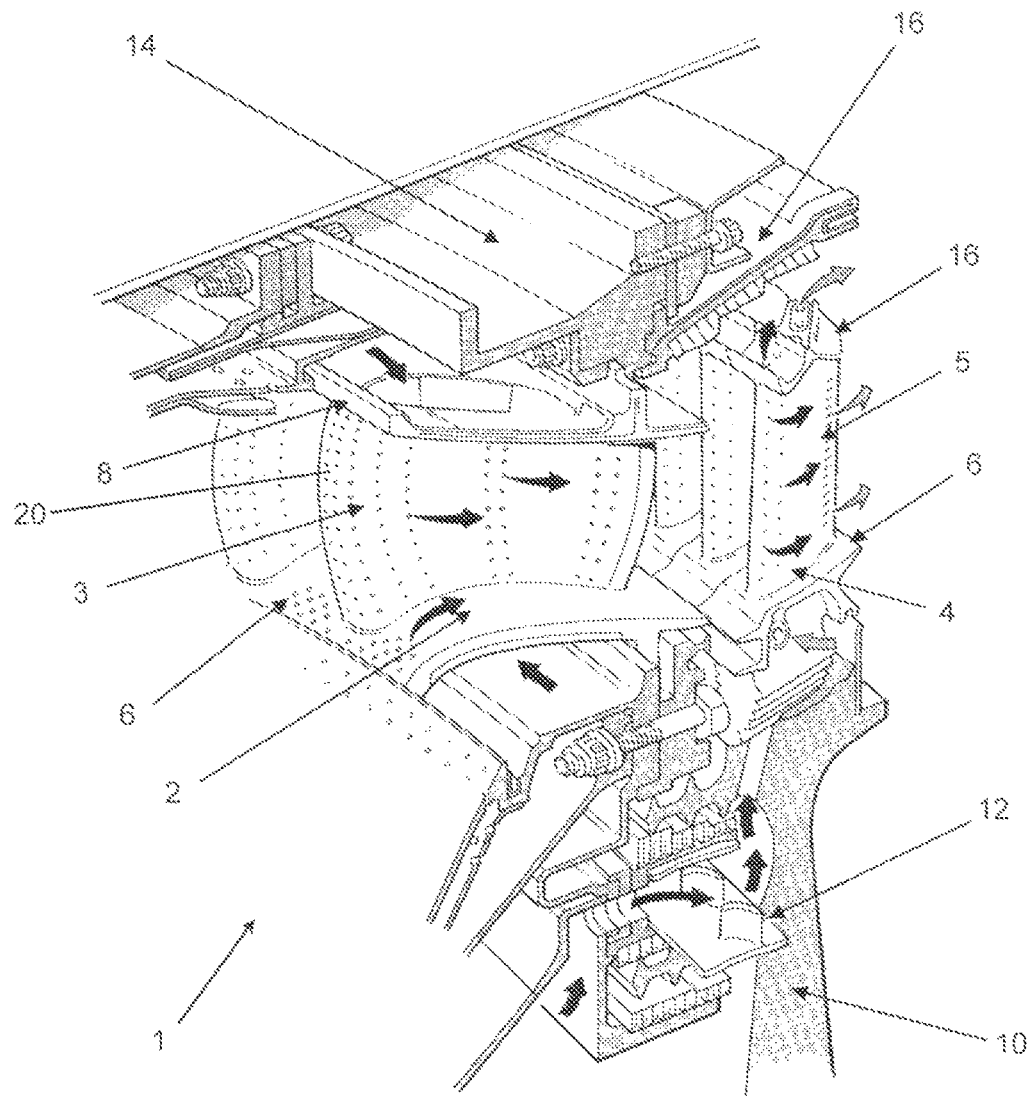
FIG. 1 is an isometric cut-away view of a typical single-stage cooled gas turbine engine showing the guide vanes, turbine rotor blades, platform structures and other components.

FIG. 1 of the accompanying drawings is an isometric cut-away view of a typical single-stage cooled gas turbine engine 1, showing the nozzle guide vanes (NGVs) 2 (with their respective aerofoils 3), turbine rotor blades 4 (with their respective aerofoils 5), inner and outer platforms 6, 8, HP turbine disc 10, and pre-swirl nozzles 12, as well as the cover-plates and lock plates arrangements including HP turbine support casing 14 and shroud segments 16.

The HPT blades 4 and NGVs 2 are cooled by using high pressure (HP) air from the compressor that has by-passed the combustor and is therefore relatively cool compared with the gas temperature. Typical cooling air temperatures are in the range of from about 800 to about 1000 K. Gas temperatures can be in excess of about 2100 K.

The cooling air from the compressor that is used to cool the hot turbine components is not used fully to extract work from the turbine. Extracting coolant flow therefore has an adverse effect on the engine operating efficiency. It is thus important to use this cooling air as effectively as possible. Thus, maximising the cooling efficiency of any cooling airflow on, around or within components, especially those which rely on an internal cooling arrangement, is a primary concern in the design of cooling arrangements with optimised cooling efficiency.

Figure 2:
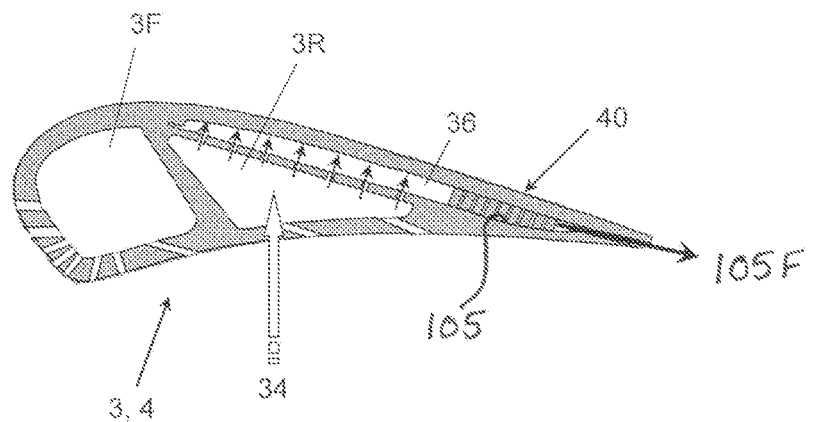
FIG. 2 is a cross-sectional view of a representative example of a typical aerofoil sectioned component such as a guide vane, showing inter alia its trailing edge portion to which various embodiments of the invention may be applied.

FIG. 2 shows—by way of one representative, but typical, example—an aerofoil sectioned component, such as a guide vane 3, showing inter alia its trailing edge portion 40 to which embodiments of the present invention may be applied. The trailing edge portion 40 comprises a trailing edge slot 105 therewithin, via which slot 105 cooling fluid, e.g. cooling air, passes from the internal cooling passage 3R (in this case the rear cooling passage 3R) to the exterior trailing edge of the component. The cooling fluid flow exiting the trailing edge slot 105 is shown as 105F. Although the component here is shown as a guide vane 3, it is to be understood that it may equally well be a turbine blade 4, or indeed any other aerofoil-sectioned component within the engine which relies on an internal, especially a slot-based, cooling arrangement to cool at least a trailing edge portion of the component. In the example component 3, 4 shown here, it comprises forward 3F and rearward 3R cooling passages, each of which is supplied with cooling air, e.g. that shown as 34 directed into the rear cooling passage 3R, e.g. from an outboard source. In the example component 3, 4 shown here, the rear cooling passage 3R includes an impingement plate 36 having holes therein through which coolant air passes from the rear passage 3R to cool the suction side section of the aerofoil. However, it is to be understood that such an impingement plate 36 is entirely optional, and many alternative internal cooling arrangements of the main body of the aerofoil which employ one or more additional internal walls (especially apertured walls), impingement plates or tubes, or even other inserts in the various cooling passages, may be possible.

Embodiments of the present invention described further below concern the trailing edge portion 40 of the aerofoil component 3, 4. Throughout the remaining drawings referred to below, the same or corresponding features in the various embodiments are referred to with the same reference numerals throughout, for simplicity.

Although the embodiments described further below and illustrated in the drawings are directed to a trailing edge portion of an aerofoil component such as a turbine blade or a guide vane, it is to be understood that the invention is not exclusive thereto, and other embodiments of the invention may be applied to cooling arrangements for other portions of such aerofoil components or indeed to cooling arrangements for other components of engines apart from aerofoil-sectioned components.

Figure 3:
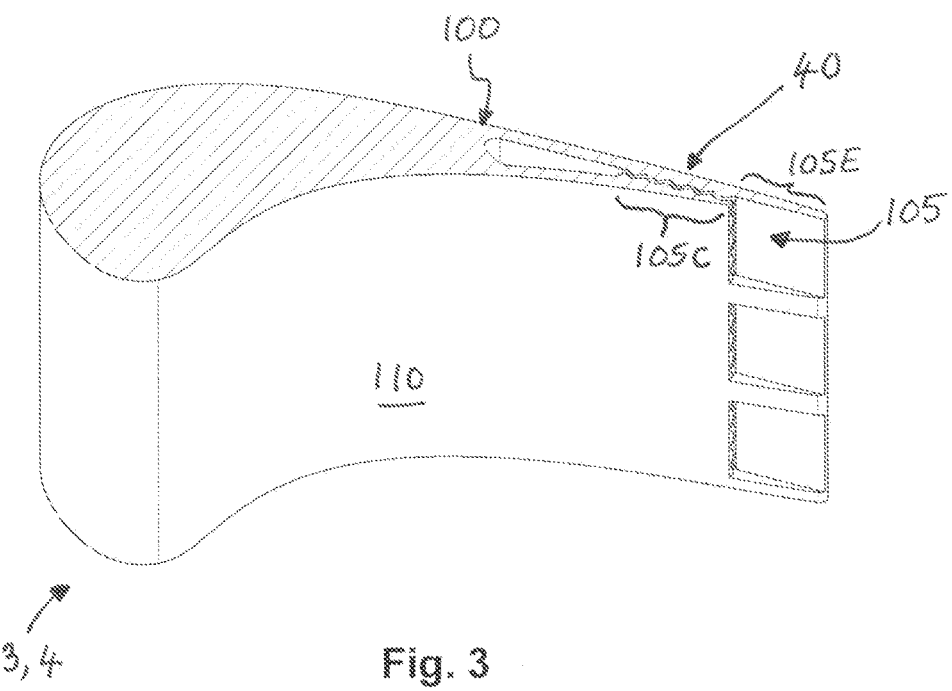
FIG. 3 is perspective view of an aerofoil component in accordance with an embodiment of the invention.
Figure 4A:
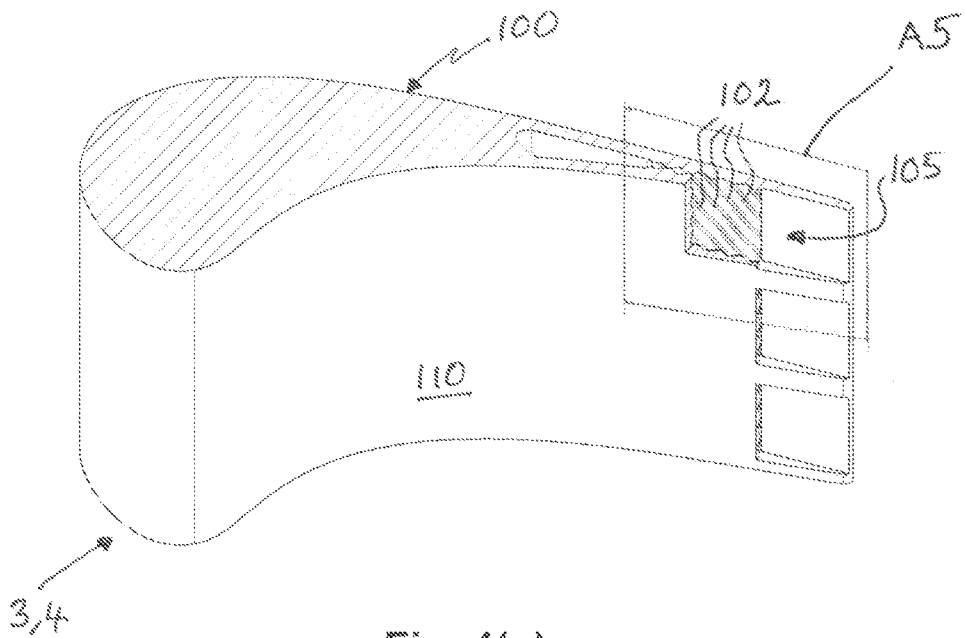
FIG. 4(a) is a perspective cut-away view of the embodiment aerofoil component of FIG. 3, showing the arrangement of channels formed in the interior wall of the suction side of the aerofoil.
Figure 4B:
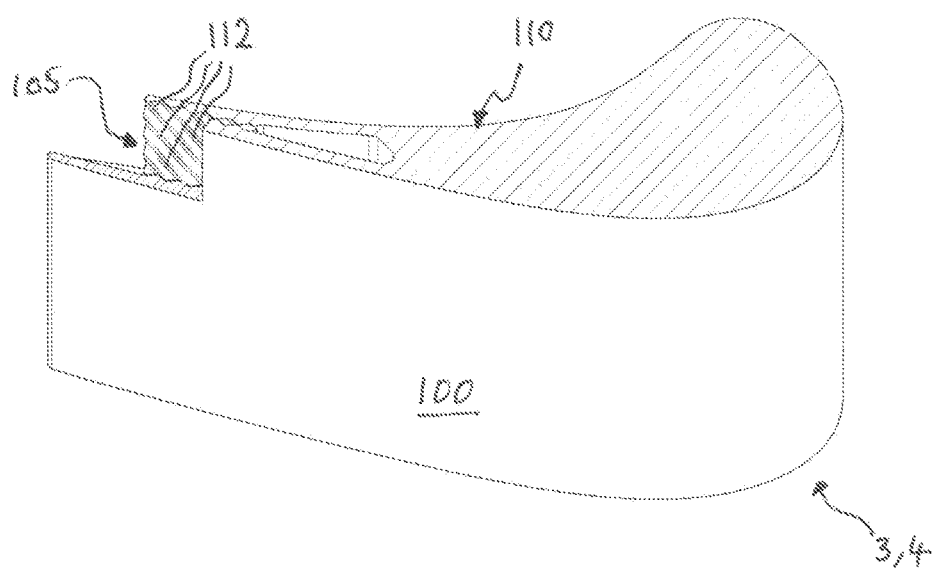
FIG. 4(b) is another perspective cut-away view, from the opposite direction from that in FIG. 4(a), of the same aerofoil component of FIG. 3, showing the arrangement of channels formed in the interior wall of the pressure side of the aerofoil.

According to a first embodiment of the invention, as shown in FIGS. 3, 4(a) and 4(b), an aerofoil component 3, 4 comprises suction and pressure side walls 100, 110, respectively. The trailing edge portion 40 of the component 3, 4 comprises a "cross-corrugated" portion 105C which comprises a first array of channels 102 formed in the interior wall of the suction side 100 of the aerofoil trailing edge slot 105 within the slot portion 105C. Downstream of the cross-corrugated slot portion 105C is an exit slot portion 105E which does not comprise any such cross-corrugated channels therein. As shown in FIG. 4(b), a second array of channels 112 is formed in the interior wall of the pressure side 110 of the aerofoil within the slot portion 105C. Each array of channels 102, 112 is a set of repeated, parallel, equi-spaced, straight corrugations on or in the respective surface side wall of the slot section 105C. By way of example only, one typical scale of dimensions for a typical turbine blade or guide vane may employ a total combined depth of the first and second channels 102, 112 of the order of from about 0.3 up to about 1.0 mm, e.g. around 0.6 mm.

Figure 5:
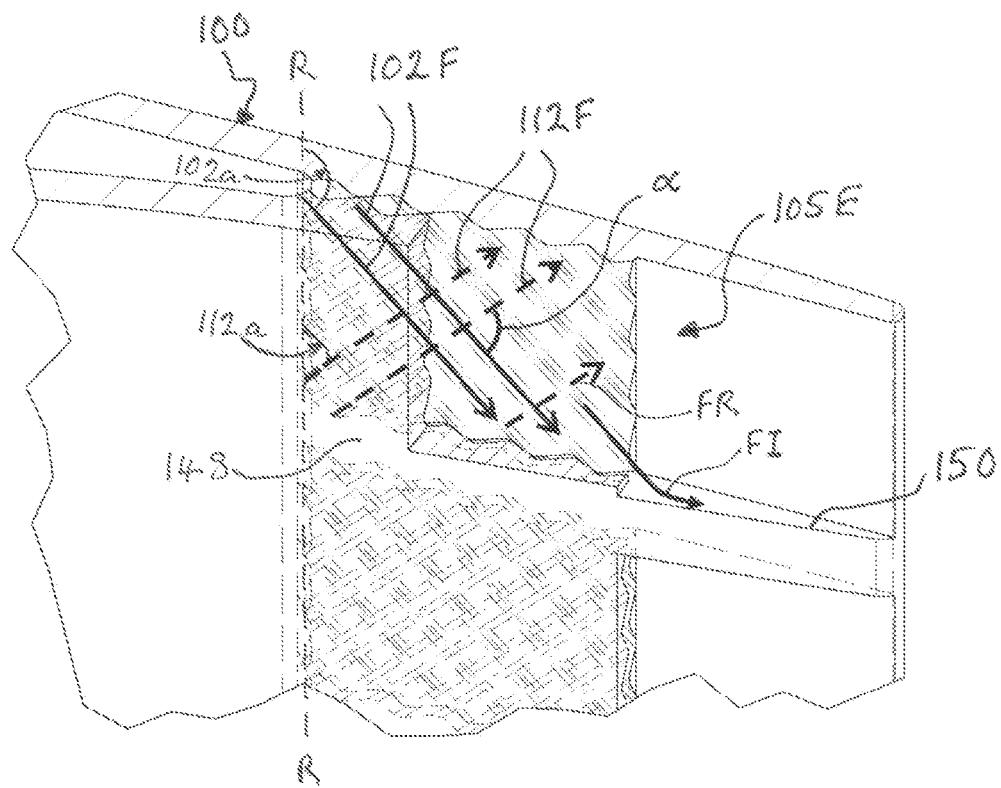
FIG. 5 is an enlarged partial cut-away, part-sectional, view of the area A5 of the aerofoil component shown in FIG. 4(a), illustrating the included angle between the channels in the interior walls of the suction and pressure side walls of the aerofoil.

As shown more clearly in FIG. 5, the first array of channels 102 (defining first cooling air flows 102F) is at a first inclined angle 102a to the radial direction R of the component (i.e. that direction which is radial relative to the longitudinal axial direction of the engine when the component is mounted therein), and the second array of channels 112 (defining second cooling air flows 112F) is at a second inclined angle 112a to that radial direction. The first and second angles 102a, 112a are different, such that an included angle α is defined between them, as shown in FIG. 5. In this manner the two arrays of channels 102, 112 are oriented so as to be angled at angle α with respect to one another, and such that peaks of the channels 102, 112 of one array periodically cross or overlap the peaks of the channels 112, 102 of the other array. The included angle α between the channels in the two arrays 102, 112 is one parameter which can be varied in order to control the flow parameters, especially the flow rate and flow direction, of cooling air which flows within and along the various channels 102, 112 within the slot 105. For example, an increase in the included angle may be used to reduce the flow rate of cooling air through the slot 105 by causing extra pressure losses due to the interaction between the individual air flows in the two sets of channels 102, 112. This reduced flow rate also increases the temperature increase of the cooling air as it passes through the slot 105, which may lead to an overall increased efficiency of the convective cooling process.

Also shown in FIG. 5 by way of representative example are examples of (i) a first cooling air flow 102F being reflected at an "internal" (i.e. within the cross-corrugated portion 105C of the slot 105) baffle wall 148 within the slot 105, and (ii) another first cooling air flow 102F impinging and/or washing over an "external" (i.e. outside the cross-corrugated portion 105C of the slot 105) baffle rib element 150 in the slot exit portion 105E. These features will be discussed further below in relation to the embodiment shown in FIG. 9.

Figure 6:
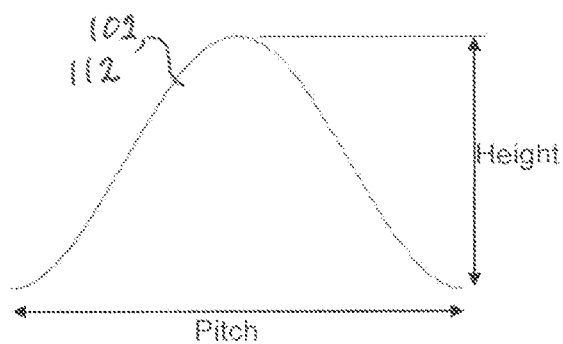
FIG. 6 is an explanatory sectional view of one wavelength of the surface profile of the sidewalls which defines the various channels.

The height and pitch of the channels 102, 112 may also vary and may be independently selected, along with other variable parameters as discussed herein, so as to optimise the flow rate, direction and possibly other flow parameters. Moreover, one preferred shape of each channel is that defined by a sinusoidal wave function, one example of which is shown in FIG. 6. As shown here, each channel 102, 112 is preferably formed by side walls and peaks and troughs which are smoothly curved and present no sharp edges or corners, in order to minimise or substantially avoid undesirable stress concentrations within the slot side walls or the channels 102, 112 themselves. Various other mathematical wave functions may instead be used to define the shape of the various channels, examples of which have already been mentioned hereinabove. The cross-sectional shape of the channels may constitute yet another parameter which may be selected in order to contribute to an overall optimisation of the flow behaviour of the cooling air as it passes along and through the slot 105.

If desired or necessary, again for example to further contribute to controlling the flow behaviour of the cooling air—especially the cooling air mass flow—as it passes along and through the slot 105, the separation distance between the suction side and pressure side channels or corrugations 102, 112 may also be varied and selected to have an optimum value. Thus, the peaks of the channel formations of one array 102, 112 may in some example forms meet or abut or even merge into the peaks of the channels of the other array 112, 102, whereas in other example forms the respective sets of channel peaks may be separated from each other by a separation distance or gap of at least a predefined minimum value. This feature will be discussed further below in relation to the embodiments shown in FIGS. 7(a) to (e).

As shown by way of some examples in FIGS. 7(a) and 7(b) to (e), the open mouth portions of the various channels at their respective downstream ends may be tailored in their shape and/or configuration to help control the exit flow of cooling air as its exits the exhaust outlets thus formed at the downstream end of the trailing edge corrugated slot portion 105C. FIGS. 7(b) to (e) show various end perspective views, from the trailing edge 40 of the aerofoil, of the generalised end perspective view of FIG. 7(a), showing various configurations of exhaust outlets via which cooling air exits the trailing edge slot portion 105C, which exhaust outlets are formed by the combining together of mouth portions of facing channels in the downstream end region of the slot portion 105C in such ways as to have varying degrees of alignment or non-alignment (i.e. varying degrees of being in-phase or out-of-phase). For example: FIG. 7(b) shows the mouth portions of facing channels 102, 112 to be substantially in-phase (and thus in register), with the respective sets of peaks of the respective channel formations being separated by a relatively small separation gap 130; FIG. 7(c) shows the mouth portions of facing channels 102, 112 to be substantially out-of-phase (and thus out of register), with the respective sets of peaks of the respective channel formations substantially abutting or touching one another with no gap in between; FIG. 7(d) shows the mouth portions of facing channels 102, 112 to be substantially out-of-phase (and thus out of register), with the respective sets of peaks of the respective channel formations being separated by a relatively large separation gap 140; and FIG. 7(e) shows the mouth portions of facing channels 102, 112 to be substantially out-of-phase (and thus out of register), but with the respective sets of peaks of the respective channel formations being united together or merging into one another, such as at sites 144. The arrangement shown in FIG. 7(b) is shown more clearly in FIG. 8(b), and that in FIG. 7(c) shown more clearly in FIG. 8(a).

Figure 8A:
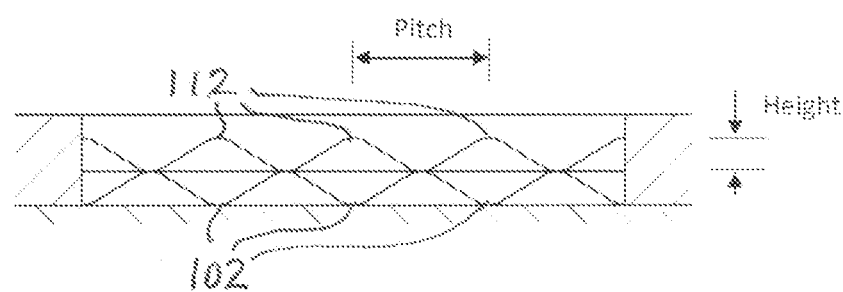
FIGS. 8(a) and 8(b) are, respectively, enlarged rotated end-on views of the mutual configurations of the mouth portions of facing channels in the exit regions of the slots of the arrangements shown respectively in FIGS. 7(c) and 7(b)
Figure 8B:
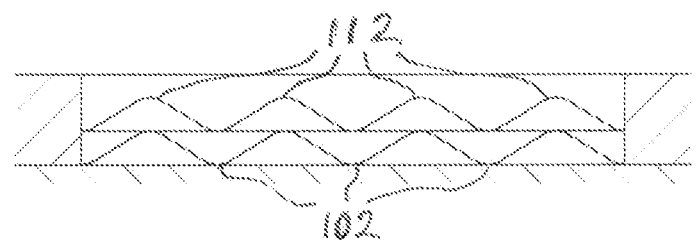

FIGS. 8(a) and 8(b) also illustrate, by way of example, exhaust outlet configurations which may assist in particularly shaping the cooling air flows as they exit the trailing edge corrugated slot section 105C. For example, the geometry shown in FIG. 8(a) tends to produce well-defined, coalescing jets of exit air at the exit plane, whereas the geometry shown in FIG. 8(b) tends to produce a more uniform exit flow. It is worth noting also that the exit jets here maintain sideways momentum for a short distance beyond the limit of the exhaust apertures of the slot, so that an optimal film cover may not necessarily be produced by the geometry shown in FIG. 8(a).

The above-mentioned pressure drop which advantageously occurs as the cooling air passes through and along the various channels 102, 112, may also be controlled to some extent by the inertial pressure losses that follow when the air flow changes direction at the respective slot side walls 100, 110, owing to the crossing spatial relationship between the two arrays of channels 102, 112 (at the included angle α—see FIG. 5). Thus, at the sides of the slot portion 105C the air flow is "reflected" from each side wall 100, 110 and swaps or switches from one array of channels 102/112 to the other array of channels 112/102. This behaviour is shown schematically in FIG. 9.

Figure 9:
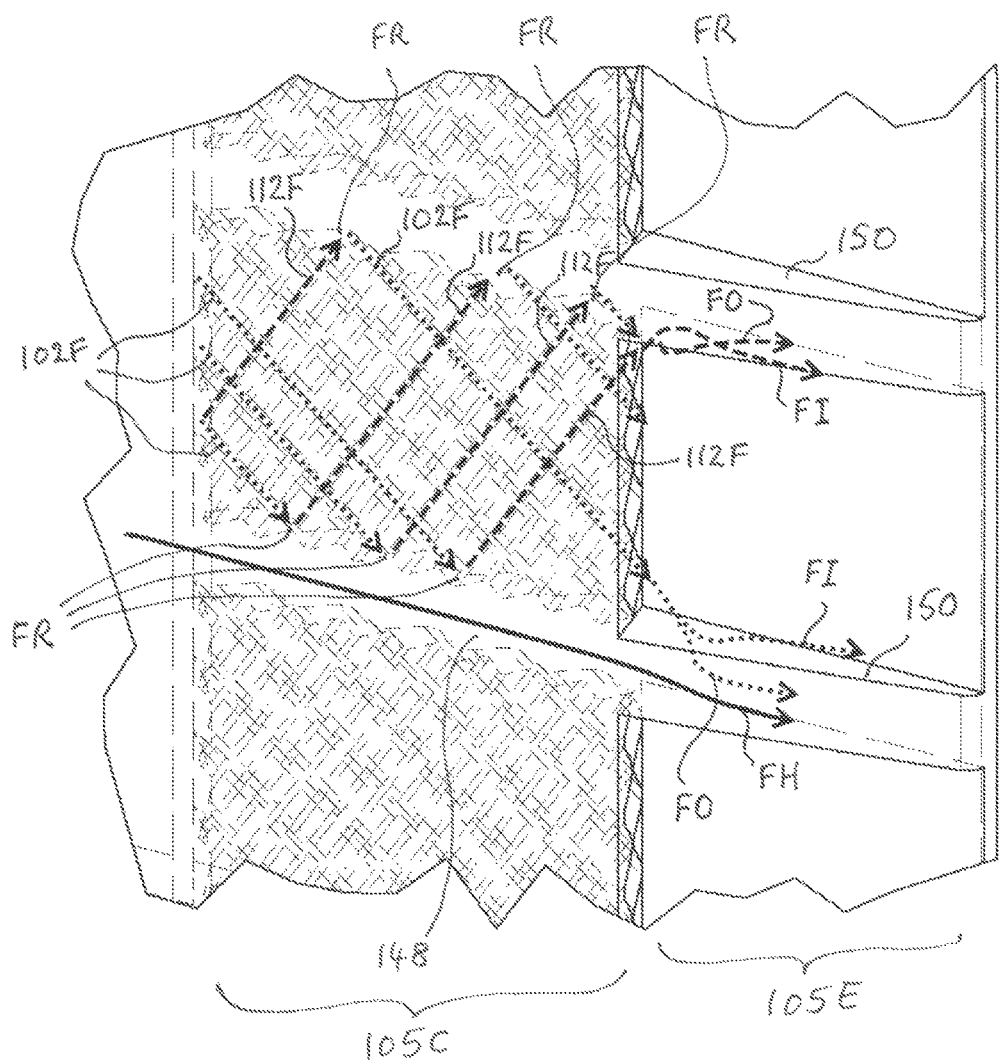
FIG. 9 is an enlarged partial cut-away, part-sectional, view of part of the slot side walls and channels arrangement of another embodiment of aerofoil component according to the invention, showing the various cooling air flows being reflected between the respective arrays of channels in the respective sidewalls by one arrangement of one or more "internal" baffle elements, as well as showing the various cooling air flows as they exit the slot and impinge upon and/or flow over or around one or more other, "external", baffle elements of the arrangement.

Particularly in the case of embodiments which employ relatively low-flow systems, this pressure drop may be further exploited by introducing, as shown in FIG. 9, one or more internal longitudinal baffle walls 148 into either the channels 102, 112 themselves, or to any gap between the respective slot side walls, or into any separation gap (as referred to above) between facing peaks of the channel formations of the respective arrays 102, 112 in the slot corrugated portion 105C. As shown in FIG. 9, the or each baffle wall 148 reflects the air flows 102F in respective channels 102 of the first array as they impinge thereon so they are reflected and diverted, as at sites FR, to become respective air flows 112F in respective channels 112 of the second array.

Optionally this pressure drop may be even further exploited by additionally introducing, as also shown in FIG. 9, one or more longitudinal baffle rib elements 150 into a portion of the slot 105, especially the non-corrugated portion 105E thereof, immediately downstream of the slot corrugated portion 105C. Such one or more baffle rib elements 150 may for example be in the form of at least one elongate wall, rib, shoulder or land of material that protrudes into the interior of the slot portion 105E and against which the various air flows impinge and are diverted or redirected (or wash over) as they pass along and out of the respective channel(s) at their respective exhaust outlets. One such arrangement of a plurality of radially spaced apart baffle ribs 150 is illustrated by way of example in FIG. 9. The air flows corresponding to an impingement on the respective baffle rib elements 150 are shown as FI and the air flows corresponding to a washing up and over the respective baffle rib elements 150 are shown as FO.

Note also in FIG. 9 that, by way of example, the channels 112 in the pressure side wall 110 of the slot section 105C are at a different and greater angle to the component radial direction R (see FIG. 5) than are the channels 102 in the suction side wall 100 of the slot section 105C. The steeper angle to the radial direction R of the pressure wall channels 112 results in an increased angle of reflection and/or degree of impingement flow diversion, thereby possibly further enhancing the pressure drop effect.

Also shown representatively in FIG. 9, by way of example, is the advantageous displacement of a hot air flow FH flowing over the exterior pressure side wall 110 of the component somewhat away from that exterior pressure side wall surface in the trailing edge region of the component, as a result of the impinging and washing over air flows FI and FO exiting the corrugated slot section 105C and interacting with the baffle rib elements 150. This displacement effect may thus help to reduce deleterious heat transfer from such hot air flows FH to the exterior of pressure side wall surface in the trailing edge region of the component.

In addition to enhancing inertial pressure losses, the presence of any such one or more baffle walls 148 and/or rib elements 150 may additionally serve to increase the mechanical strength of the respective slot side wall(s) and may also increase heat flux from the pressure side to the suction side, or vice versa, of the trailing edge slot, thereby helping to reduce thermal stresses therein.

The extra pressure loss caused by the interaction of the cooling air flows in the two arrays of channels 102, 112, and the inertial pressure losses which occur where the air flows change direction at the slot side walls and/or at the respective internal baffle walls 148, mean that channels 102, 112 each with larger characteristic dimensions, e.g. corrugation height and/or pitch (see FIGS. 6 and 8(a)), may be able to be used for achieving a particular cooling air mass flow rate and pressure difference. This permitted increase in the channel dimensions may also be useful in reducing the arrangement's susceptibility to, or risk of the channels 102, 112, becoming blocked, e.g. through the build-up of combustion or other deposits (such as dirt, pollution or environmental residues) during use of the engine.

Figure 10A:
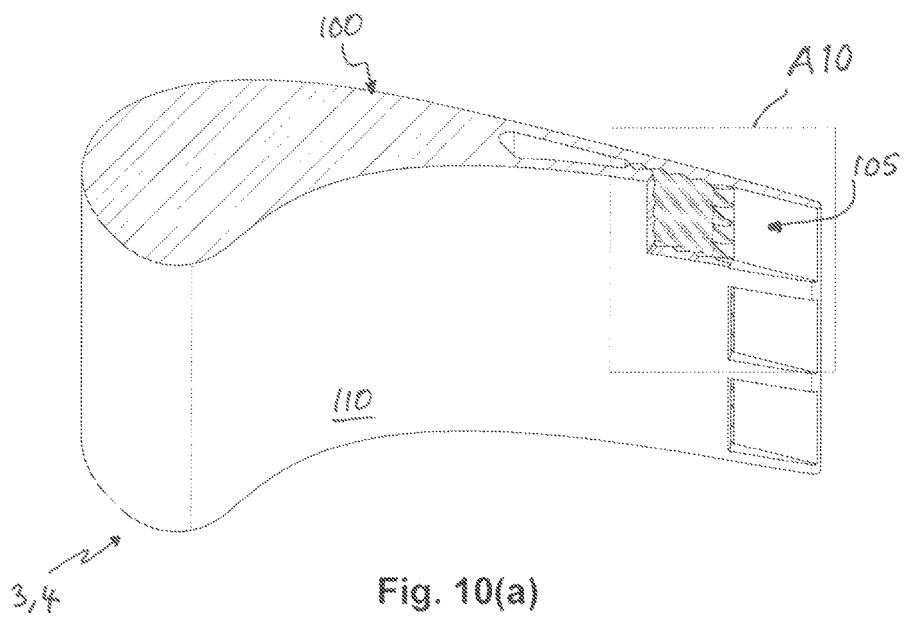
FIG. 10(a) is a perspective cut-away view of another embodiment aerofoil component, corresponding to that of FIG. 4(a), but showing an alternative configuration of the channels in the interior wall of the suction side of the aerofoil slot.

Furthermore, the undulating channels 102, 112 need not be restricted to wholly straight channels. In some further embodiments, in order to achieve greater film cooling effectiveness after the cooling air flows leave the trailing edge corrugated slot portion 105C, at least some of the channels in at least one of, and preferably both of, the arrays may be configured such that the flow exhausts at a specific predetermined angle relative to the general longitudinal flow direction of cooling air through the trailing edge slot, or alternatively relative to a flow direction of gas or other fluid external to the component at or adjacent the slot exit at the trailing edge of the component. One example of this is shown in FIGS. 10(a), (b) and (c), where the angled flow direction 102F in the major upstream portion of each channel 102 bends (e.g. at region 102B) so as to become an exit flow 102E which is oriented substantially parallel to the external gas flow at the exterior of the component adjacent the exit of the slot portion 105C. Likewise, the oppositely angled flow direction 112F in the major upstream portion of each channel 112 bends (e.g. at region 112B) so as to become an exit flow 112E which is similarly oriented substantially parallel to the external gas flow at the exterior of the component adjacent the exit of the slot portion 105C.

Figures 10B, 10C:
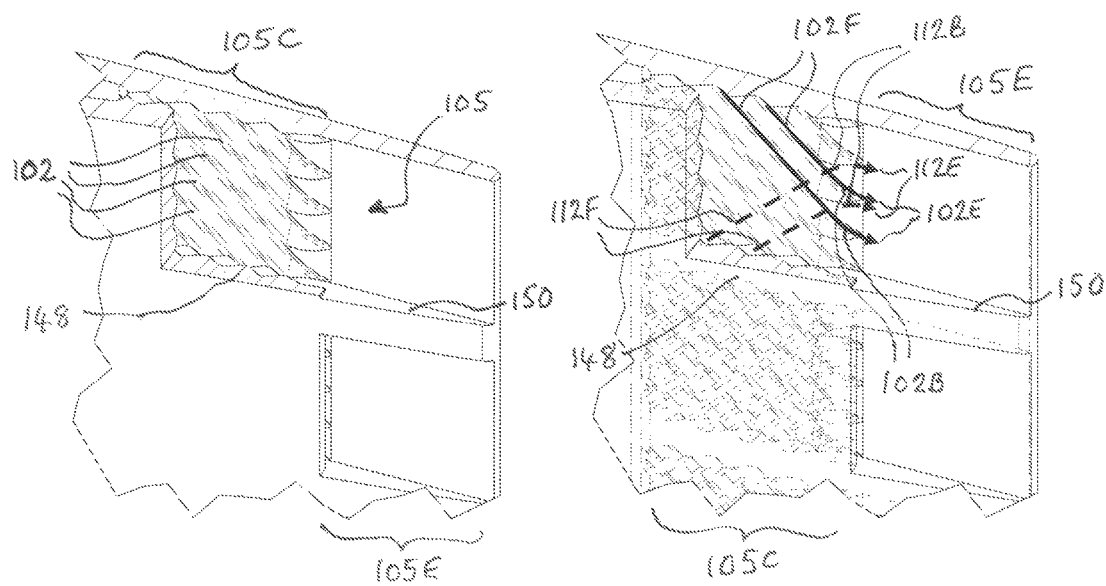
FIG. 10(b) is an enlarged partial cut-away view of the area A10 of the aerofoil component shown in FIG. 10(a), showing the alternative channel configuration, in particular in their exit regions, in more detail.
FIG. 10(c) is an enlarged partial cut-away, part-sectional, view of the aerofoil component as shown in FIG. 10(b), showing the cooling air flows being redirected prior to exiting the slot by virtue of the respective channels being bent in shape in this region of the slot.

In the preceding embodiment illustrated in FIG. 10, the straightening of the channels as they approach their exhaust outlets, whilst they remain continuous and thus providing generally uninterrupted air flow therealong, may if desired also inherently increase the channels' pitch as defined perpendicular to the air flow direction (see FIGS. 6 and 8(a)), thereby increasing the channels' individual flow area in this region and so helping to reduce the occurrence of channel blockage, e.g. from deposits or debris.

Furthermore, in certain other embodiments (not shown in the drawings), the portions of at least some of the channels close to their exhaust exit outlets or apertures may if desired be shaped so as to create a more uniform and continuous flow of exhaust air as it exits the slot portion 105C as a whole from the individual channel mouth portions. This may be achieved for example by flattening the channels in the vicinity of their mouth portions. Of course, careful optimisation of such flattening may be necessary in order to maximise the film cooling effectiveness of the overall exhaust air flow.

Figure 11:
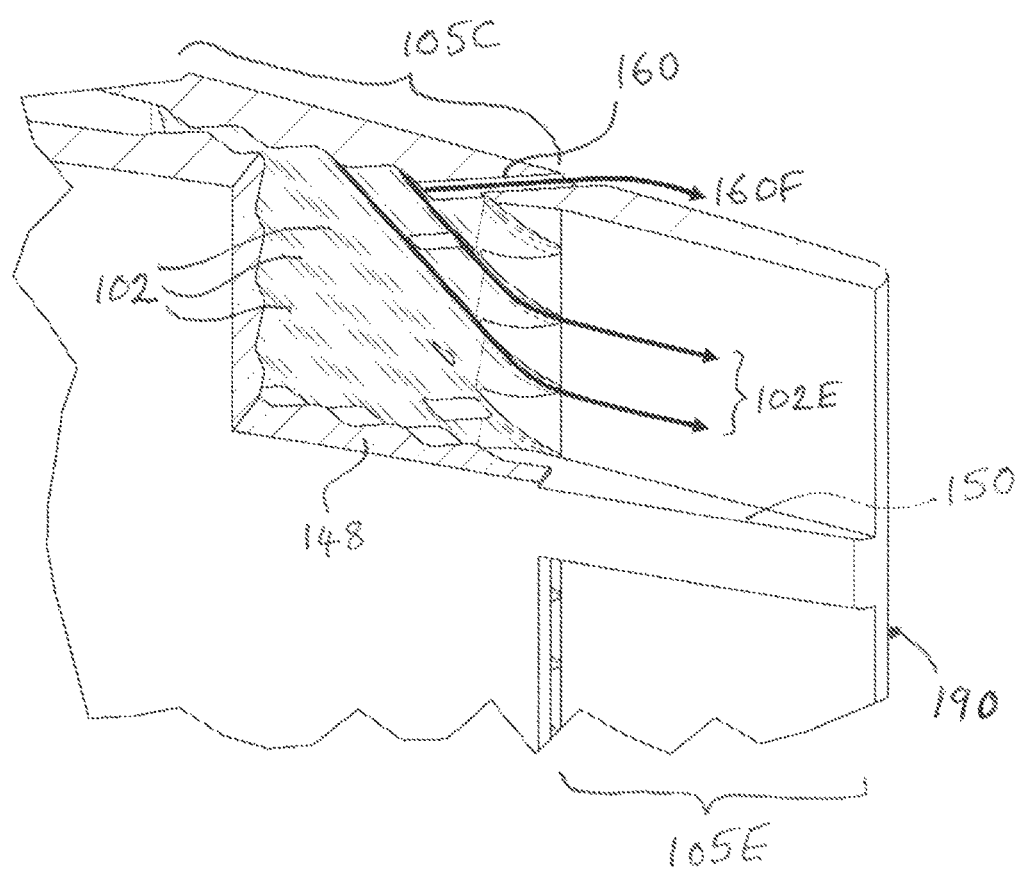
FIG. 11 is a perspective partial cut-away view of yet another embodiment of cooling arrangement according to the invention, showing the inclusion of cooling through-holes in the suction side wall of the trailing edge slot in order to enhance film cooling on the exterior of that suction side of the component.

As shown in FIG. 11, in another embodiment form one or more, e.g. a plurality or series of, cooling through-holes 160 may be provided in one (or possibly both) of the side walls, e.g. especially the suction side wall 100, of the trailing edge slot 105 in order to enhance film cooling on the exterior of that suction side 110 of the component. This may for example be useful in order to provide a "short-cut" escape flow route 160F directly to the slot exit for cooling air passing through the slot which may be expected to increase in temperature too much as a result of the enhanced degree of heat transfer arising from the improved geometry of the internal air flow arrangement.

Whilst referring still to the embodiment of FIG. 11, the ability of embodiments of the invention to tune mass flow and pressure drop through the slot 105 allows for the possibility of using suction surface film cooling throughholes 160 near the trailing edge 190 of the component, as shown in FIG. 11. Conventionally, the use of suction surface films near the rear of an aerofoil is often not desirable because of the tendency of films applied to this region to quickly lift off from the surface, causing a large penalty to aerodynamic efficiency. However, using such an embodiment of the invention as illustrated here to reduce the pressure ratio across the film holes may cause the films to exhaust onto the suction surface with sufficiently low blowing and momentum ratios to remain on that surface.

Figure 12A:
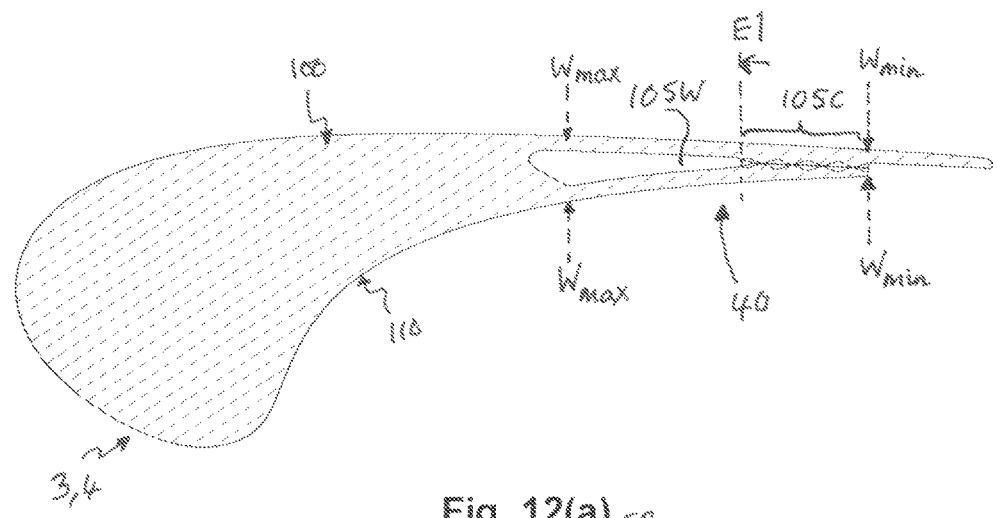
FIGS. 12(a), 12(b) and 12(c) are cross-sectional views of three further example embodiments, which may be particularly useful in the context of an aerofoil component manufactured by an additive/deposition layer manufacturing (ALM) method, in which the regions of the trailing edge slot side walls which are provided with the arrays of channels extend by various distances into that region of the trailing slot in which its width broadens out, whereby removal of excess powder therefrom after the channels' formation by ALM may be facilitated.
Figure 12B:
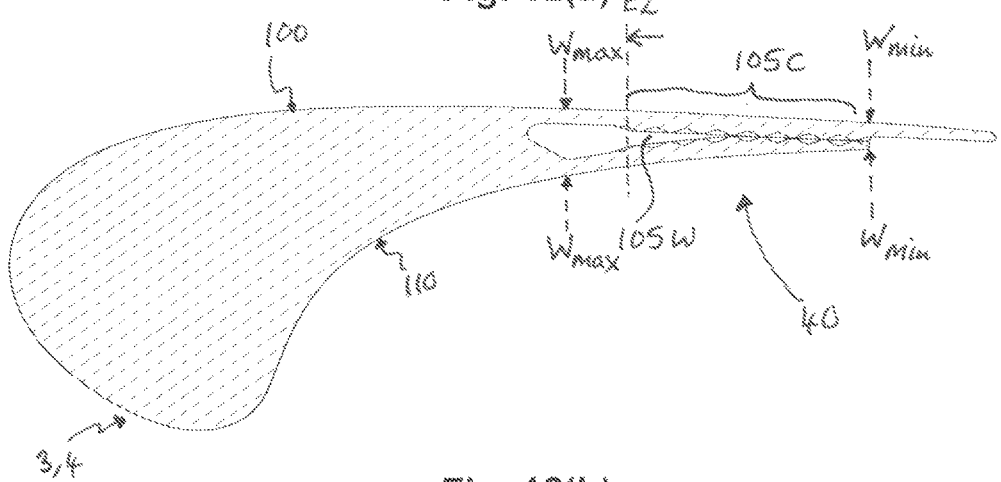
Figure 12C:
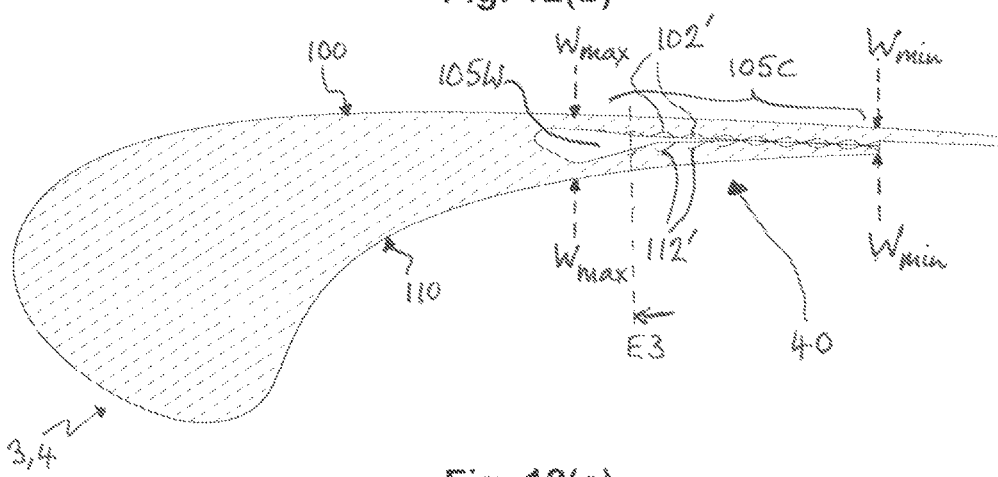

Turning to FIGS. 12(a), 12(b) and 12(c), here there are shown further embodiment arrangements which may be particularly useful in the context of an aerofoil component manufactured by an additive/deposition layer manufacturing (ALM) method. In each of these arrangements the longitudinal extent of the trailing edge slot 105 may be defined between maximum $W_{max}$ and minimum $W_{min}$ points, with the width of the slot becoming greater going upstream from the latter to the former.

In the arrangement shown in FIG. 12(a) the regions of the trailing edge slot side walls 100, 110 which are provided with the arrays of channels 102, 112 therein, i.e. the portions of the side walls defining the corrugated slot portion 105C, extend by a certain distance up to, but substantially not into, the region 105W of the trailing edge slot 105 in which its width broadens out, i.e. up to an upstream limit point such as at E1. In this manner the general planes of the opposite side walls portions which define the resulting corrugated slot section 105C are substantially parallel. In the arrangement shown in FIG. 12(b) the regions of the trailing edge slot side walls 100, 110 which are provided with the arrays of channels 102, 112 therein, i.e. the portions of the side walls defining the corrugated slot portion 105C, extend by a significant distance into the region 105W of the trailing edge slot 105 in which its width broadens out, and up to an upstream limit point such as at E2. In this manner the general planes of the opposite side walls portions which define the resulting corrugated slot section 105C are substantially non-parallel, with the width of the corrugated slot portion 105C increasing in an upstream direction. Likewise, in the arrangement shown in FIG. 12(c) the regions of the trailing edge slot side walls 100, 110 which are provided with the arrays of channels 102, 112 therein, i.e. the portions of the side walls defining the corrugated slot portion 105C, extend by a similar significant distance into the region 105W of the trailing slot 105 in which its width broadens out, and up to a similar upstream limit point such as at E3 which may substantially correspond in location to the limit point E2 in FIG. 12(b). Again, in this manner the general planes of the opposite side walls portions which define the resulting corrugated slot section 105C are substantially non-parallel, with the width of the corrugated slot portion 105C increasing in an upstream direction. However, in this latter arrangement of FIG. 12(c) the height of one or more of the channels 102', 112' in either or both of the arrays (on either or both sides of the slot section 105C), especially those channels 102', 112' at, towards or increasingly towards the upstream limit point E3, may be of increased height or depth, or of increasing height or depth going towards that limit point E3, in order to occupy or fill more of the internal transverse width of the trailing edge slot section 105C as its width broadens out in the region 105W.

The arrangements shown in these three FIGS. 12(a), 12(b) and 12(c) may be particularly useful in the context of aerofoil components manufactured by an additive/deposition layer manufacturing (ALM) method, as it enables excess powder or other manufacturing debris to be more easily removed from the trailing edge slot after the formation of the various channels in the restricted spatial environment of this region of the component.

If desired or necessary in any of the foregoing embodiments described and illustrated with reference to the accompanying drawings, one or more, e.g. a series or a plurality of, notches, teeth or crenulations may be provided at or on a lip of the slot exit, in order further to modify the mixing properties between the flow of cooling air exiting the slot and the mainstream flow of gas exterior of the component and into which the exiting cooling air flows as it exits the slot.

It is to be understood that the above description of embodiments and aspects of the invention has been by way of non-limiting examples only, and various modifications may be made from what has been specifically described and illustrated whilst remaining within the scope of the invention as defined in the appended claims.

Throughout the description and claims of this specification, the words "comprise" and "contain" and variations of the words, for example "comprising" and "comprises", mean "including but not limited to", and are not intended to (and do not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Furthermore, features, integers, components, elements, characteristics or properties described in conjunction with a particular aspect, embodiment or example of the invention are to be understood to be applicable to any other aspect, embodiment or example described herein, unless incompatible therewith.

The invention claimed is:

1. A component for a gas turbine engine, comprising first and second walls defining at least one passage for supply of a cooling fluid to a portion of the component to be cooled, the said portion comprising a slot via which cooling fluid passes from the passage to an exit of the slot for effecting cooling of the portion, wherein
   the slot comprises at least one side wall having a surface profile that undulates in a first direction defining an array of channels extending in a second direction for passage of cooling fluid therethrough, each channel of the array of channels being defined by adjacent peaks of undulations in the surface profile.

2. A component according to claim 1, wherein the slot comprises a first side wall having the surface profile that undulates in the first direction, and a second side wall, opposite the first side wall, having a second surface profile that undulates in a third direction defining a second array of channels extending in a fourth direction for passage of cooling fluid therethrough, each channel of the second array of channels being defined by adjacent second peaks of undulations in the second surface profile, wherein the channels of the array of channels are oriented so as to be non-parallel to the channels of the second array of channels.

3. A component according to claim 1, wherein:
   the channels within the or each respective array are substantially parallel to each other, and/or
   the channels within the or each respective array are substantially equi-spaced relative to each other.

4. A component according to claim 2, wherein the channels in the array of channels are generally oriented with their longitudinal axes at a first angle relative to the radial direction of the component, and the channels in the second array of channels are generally oriented with their longitudinal axes at a second angle relative to the radial direction of the component, wherein both the first and second angles are each greater than 0° and less than 180° relative to the said radial direction, both angles being defined on the same axial side of that radial direction, and the first and second angles are different from one another.

5. A component according to claim 4, wherein the difference between the first and the second angles is an included angle of from about 60° to about 120°.

6. A component according to claim 2, wherein a distance transversely across the slot between peaks of the channel-defining surface of the array of channels and peaks of the channel-defining surface of the second array of channels is selected from variable such values thereof, such that a minimum transverse separation or gap between the array of channels and the second array of channels is selected so as to be of a predetermined value.

7. A component according to claim 2 wherein at least one of the slot side walls and/or at least one or more of the channels themselves in either or both of the arrays is/are provided with at least one baffle element configured so as to reflect, divert or change the flow direction of a flow of cooling fluid as it impinges thereon or thereagainst during its passage through the respective channel(s) and/or through the slot.

8. A component according to claim 2, wherein:
(i) at least one or more of the channels of the or at least one respective array each has a downstream portion which has a longitudinal direction which is different from that of a major, upstream portion thereof; and/or
(ii) at least some respective ones of the channels of one of the arrays terminate in respective mouth portions which each combine together with corresponding respective mouth portions of at least some respective ones of the channels of the other of the arrays so as to form respective exhaust apertures having a predetermined shape and/or geometry.

9. A component according to claim 1, wherein the or each surface profile of the or the respective slot side wall is defined by a smooth, wavelike curve which changes smoothly in direction over at least a portion of its pitch, wherein the sectional profile of the surface forming each channel of the respective array is such that a tangent to the channel-defining surface, perpendicular to the channel longitudinal direction, varies in its angle of orientation, relative to the general plane of the respective side wall, substantially continuously over at least a portion of its curve between one side of the channel and an opposite side thereof.

10. A component according to claim 9, wherein the channels in the or the respective side wall surface are defined by a surface profile with substantially no edges or corners which present an angled boundary between two adjacent surface portions thereof.

11. A component according to claim 9, wherein the wave function defining the or each undulating surface profile defining the respective channels is a waveform defined by a mathematical function or a combination of two or more mathematical functions which define(s) a regular repeating wave having a substantially constant wavelength and/or amplitude.

12. A component according to claim 11, wherein the wave function defining the or each undulating surface profile defining the respective channels is selected from a sinusoidal wave function, a polynomial wave function, an exponential wave function, or a combination of two or more different shape or wave functions each defining a different part or region of the curve defining the surface profile of a given channel.

13. A component according to claim 12 wherein the channels in the or the respective side wall surface are defined by a surface profile with substantially no edges or corners which present an angled boundary between two adjacent surface portions thereof.

14. A component according to claim 1, which is made by a process selected from a casting process or a layered deposition or additive layer manufacturing method.

15. A gas turbine engine comprising at least one component including a cooling arrangement according to claim 14.

16. A gas turbine engine comprising at least one component according to claim 1.

17. A cooling arrangement for a component of a gas turbine engine, wherein the component comprises first and second walls defining at least one passage for supply of a cooling fluid to a portion of the component to be cooled, the said portion comprising a slot via which cooling fluid passes from the passage to an exit of the slot for effecting cooling of the portion, wherein the cooling arrangement comprises a first side wall of the slot which has a first surface profile that undulates defining first peaks extending in a first direction, the first peaks defining a first array of channels for passage of cooling fluid therethrough, each channel of the first array of channels being defined by adjacent first peaks,
and wherein the first surface profile is defined by a cross-section of the first side wall in a direction that extends through the array of channels;
and wherein the cooling arrangement comprises a second side wall, opposite the first side wall, having a second surface profile that undulates defining second peaks extending in a second direction, different than the first direction, defining a second array of channels for passage of cooling fluid therethrough, each channel of the second array of channels being defined by adjacent second peaks.

18. A method of cooling a portion of a component of a gas turbine engine during operation thereof, wherein the component comprises first and second walls defining at least one passage for supply of a cooling fluid to the portion thereof, the said portion comprising a slot via which cooling fluid passes from the passage to an exit of the slot, wherein the slot comprises at least one side wall having a surface profile that undulates in a first direction defining an array of channels extending in a second direction for passage of cooling fluid therethrough, each channel of the array of channels being defined by adjacent peaks of undulations in the surface profile,
wherein the method comprises, whilst operating the engine, passing cooling fluid from the passage to the exit of the slot via the slot such that the cooling fluid passes along the said array of channels in the at least one side wall.

19. A method according to claim 18, wherein the slot comprises a first side wall having the surface profile that undulates in the first direction, and a second side wall, opposite the first side wall, having a second surface profile that undulates in a third direction, different than the first direction, defining a second array of channels extending in a fourth direction for passage of cooling fluid therethrough, each channel of the second array of channels being defined by adjacent second peaks of undulations in the second surface profile, wherein the channels of the first array are oriented so as to be non-parallel to the channels of the second array,
  wherein the method further comprises, whilst operating said engine, passing cooling fluid from the passage to the exit of the slot via the slot such that the cooling fluid passes along the said second arrays of channels in the second side wall,
  and additionally passing between at least one or more channels of the array of channels and at least one or more channels of the second array of channels.

20. A component for a gas turbine engine, comprising first and second side walls defining at least one passage for supply of a cooling fluid to a portion of the component to be cooled, the said portion comprising a slot via which cooling fluid passes from the passage to an exit of the slot for effecting cooling of the portion, wherein
  the slot comprises at least one of the first and second side wall having a surface profile that undulates in a first direction defining an array of channels extending in a second direction for passage of cooling fluid therethrough, each channel of the array of channels being defined by adjacent peaks of undulations in the surface profile, and
  the slot further comprises a baffle wall extending from the first side wall to the second side wall such that at least a portion of the cooling fluid passing through the array of channels impinges the baffle wall in the second direction.

* * * * *